United States Patent
Wang et al.

(10) Patent No.: US 9,506,427 B2
(45) Date of Patent: Nov. 29, 2016

(54) SYSTEM FOR RECIRCULATING ENGINE EXHAUST GAS

(71) Applicant: DOOSAN INFRACORE CO., LTD., Incheon (KR)

(72) Inventors: Taejoong Wang, Gyeonggi-do (KR); Dongin Lee, Seoul (KR)

(73) Assignee: Doosan Infracore Co., Ltd., Incheon (KR)

(*) Notice: Subject to any disclaimer, the term of this patent is extended or adjusted under 35 U.S.C. 154(b) by 52 days.

(21) Appl. No.: 14/390,288

(22) PCT Filed: Apr. 4, 2013

(86) PCT No.: PCT/KR2013/002818
§ 371 (c)(1),
(2) Date: Oct. 2, 2014

(87) PCT Pub. No.: WO2013/151356
PCT Pub. Date: Oct. 10, 2013

(65) Prior Publication Data
US 2015/0184619 A1    Jul. 2, 2015

(30) Foreign Application Priority Data
Apr. 5, 2012 (KR) .................. 10-2012-0035415

(51) Int. Cl.
*F02B 47/08* (2006.01)
*F02M 25/07* (2006.01)
(Continued)

(52) U.S. Cl.
CPC ........ *F02M 25/0726* (2013.01); *F01N 13/107* (2013.01); *F02B 37/025* (2013.01);
(Continued)

(58) Field of Classification Search
CPC .................. F02M 25/0707; F02M 25/0737; F02M 25/0731; F02M 25/0735; F02M 25/0728
USPC ..................................... 123/568.12
See application file for complete search history.

(56) References Cited

U.S. PATENT DOCUMENTS

| 7,363,761 B1 | 4/2008 | Dickerson |
| 2002/0073978 A1 | 6/2002 | Feucht et al. |

(Continued)

FOREIGN PATENT DOCUMENTS

| DE | 102011077205 A1 | 12/2011 |
| EP | 2295769 A1 | 3/2011 |

(Continued)

OTHER PUBLICATIONS

Search Report dated Jun. 13, 2013 and written in Korean with English translation for International Patent Application No. PCT/KR2013/002818 filed Apr. 4, 2013, 5 pages.

(Continued)

*Primary Examiner* — Lindsay Low
*Assistant Examiner* — Charles Brauch
(74) *Attorney, Agent, or Firm* — John D. Veldhuis-Kroeze; Westman, Champlin & Koehler, P.A.

(57) ABSTRACT

The present disclosure relates to a system for recirculating engine exhaust gas, and more particularly, to a system for recirculating engine exhaust gas, which mixes a part of exhaust gas discharged from an engine with air for combustion, and recirculates the mixture, thereby inhibiting nitrogen oxide (NOx) from being generated. Therefore, a technical problem to be achieved in the present disclosure is to provide a system for recirculating engine exhaust gas which may have a simplified structure. In addition, another object of the present disclosure is to provide a system for recirculating engine exhaust gas, which improves output of an engine by increasing an amount of intake air, and further improves fuel efficiency.

4 Claims, 5 Drawing Sheets

(51) Int. Cl.
*F01N 13/10* (2010.01)
*F02B 37/02* (2006.01)
*F02D 13/02* (2006.01)

(52) U.S. Cl.
CPC ............ *F02M 26/14* (2016.02); *F02M 26/22* (2016.02); *F02M 26/42* (2016.02); *F02D 13/0276* (2013.01); *F02M 26/05* (2016.02); *F02M 26/23* (2016.02); *Y02T 10/144* (2013.01)

(56) References Cited

U.S. PATENT DOCUMENTS

| | | |
|---|---|---|
| 2003/0127077 A1 | 7/2003 | Sisken |
| 2004/0074480 A1* | 4/2004 | Chen .................. F02M 25/0732 123/568.12 |
| 2007/0130947 A1 | 6/2007 | Baumgard et al. |
| 2008/0190108 A1 | 8/2008 | Eitel et al. |
| 2011/0302917 A1 | 12/2011 | Styles et al. |

FOREIGN PATENT DOCUMENTS

| | | |
|---|---|---|
| JP | 2002-242685 | 8/2002 |
| JP | 2010-084682 A | 4/2010 |
| JP | 2011-241723 A | 12/2011 |

OTHER PUBLICATIONS

Chinese Office Action dated Feb. 1, 2016 for Chinese Application No. 201380018489.9, 6 pages.

* cited by examiner

SYSTEM FOR RECIRCULATING ENGINE EXHAUST GAS

CROSS-REFERENCE TO RELATED APPLICATION

This Application is a Section 371 National Stage Application of International Application No. PCT/KR2013/002818, filed Apr. 4, 2013 and published, not in English, as WO 2013/151356 on Oct. 10, 2013.

FIELD OF THE DISCLOSURE

The present disclosure relates to a system for recirculating engine exhaust gas, and more particularly, to a system for recirculating engine exhaust gas, which mixes a part of exhaust gas discharged from an engine with air for combustion, and recirculates the mixture, thereby inhibiting nitrogen oxide (NOx) from being generated.

BACKGROUND OF THE DISCLOSURE

In general, an engine uses gasoline or diesel as fuel, nitrogen oxide (NOx) is included in exhaust gas and discharged when fuel is combusted and exhaust gas is discharged.

Because nitrogen oxide causes environmental pollution, a technology for inhibiting the nitrogen oxide from being generated is being developed, and as the technology, there is an exhaust gas recirculation (EGR) system.

The exhaust gas recirculation system is known as a technology which reduces a concentration of oxygen by mixing a part of exhaust gas with air for combustion, and prevents a flame temperature from being rapidly raised, thereby inhibiting the nitrogen oxide from being generated.

Meanwhile, a turbocharger may be installed in the engine. In the turbocharger, a turbine and a compressor are connected to each other by a single shaft, the turbine of the turbocharger is rotated by energy (temperature and pressure) of exhaust gas, and the compressor is driven by rotational force of the turbine. The compressed air is mixed with a larger amount of fuel, thereby improving efficiency of the engine.

On the other hand, a pressure wave (or pressure pulse), which is propagated when an exhaust valve of a cylinder is opened, may act as back pressure for other cylinders. There is a problem in that the aforementioned back pressure interference action degrades performance of the exhaust gas recirculation system.

In order to inhibit the exhaust gas interference, a twin-entry layout, which has two independent passages at a portion where exhaust gas flows into the turbine from an exhaust manifold, is known to be applied.

In the exhaust gas recirculation system, when recirculating gas is obtained from only one exhaust manifold, imbalance in pressure and flow rate between two lines leading to the turbine is caused, which degrades overall performance of the turbine and the engine system.

On the other hand, in a case in which the turbocharger, to which the twin-entry layout is applied, and the exhaust gas recirculation system are applied together, the recirculating gas is generally obtained from both the exhaust manifolds. However, in a case in which a phenomenon that exhaust pressures waves are exchanged through both the exhaust manifolds is not effectively inhibited, there is a problem in that back pressure is increased such that performance of the exhaust gas recirculation system deteriorates.

On the other hand, there is an example in which the twin-entry layout is applied to the exhaust gas recirculation system, and recirculating gas is obtained from two recirculation lines. Valves are installed in the two recirculation lines, respectively, thereby inhibiting the back pressure exchange phenomenon. However, in this example, since additional valves need to be installed and designed, there is a problem in that costs are increased.

There is another exhaust gas recirculation system for solving the aforementioned problem, and the exhaust gas recirculation system in the related art will be described with reference to the attached FIG. 1.

A plurality of cylinders is disposed in an engine 10, and the cylinders may be designated as a first cylinder group 12a and a second cylinder group 12b. First and second exhaust manifolds 21 and 22 are connected to the first cylinder group 12a and the second cylinder group 12b, respectively. The first and second exhaust manifolds 21 and 22 are connected to a turbine 30 of a turbocharger.

That is, exhaust gas discharged from the first and second cylinder groups 12a and 12b is provided to the turbine 30 through the first and second exhaust manifolds 21 and 22.

The turbine 30 is connected to a compressor 40, the turbine is driven by energy of exhaust gas, and driving power drives the compressor 40 to compress air.

Meanwhile, a first recirculation line 51 and a second recirculation line 52 are connected to the first exhaust manifold 21 and the second exhaust manifold 22, respectively, such that a part of exhaust gas is obtained.

The other side of each of the first and second recirculation lines 51 and 52 is connected to a pulse converter unit 60. The pulse converter unit 60 serves to shut off a reverse flow and an exchange phenomenon of the exhaust pressure wave.

That is, exhaust gas, which circulates through the first recirculation line 51, and exhaust gas, which circulates through the second recirculation line 52, are combined in the pulse converter unit 60.

A combining recirculation line 70 is connected to the pulse converter unit 60, a cooler 90 is connected to the other side of the combining recirculation line 70, and a valve 80 is provided on the combining recirculation line 70. The valve 80 inhibits a back pressure exchange phenomenon. The cooler 90 cools high-temperature exhaust gas.

The exhaust gas cooled by the cooler 90 is sent to a mixer where air and fuel are mixed.

Figure 1:
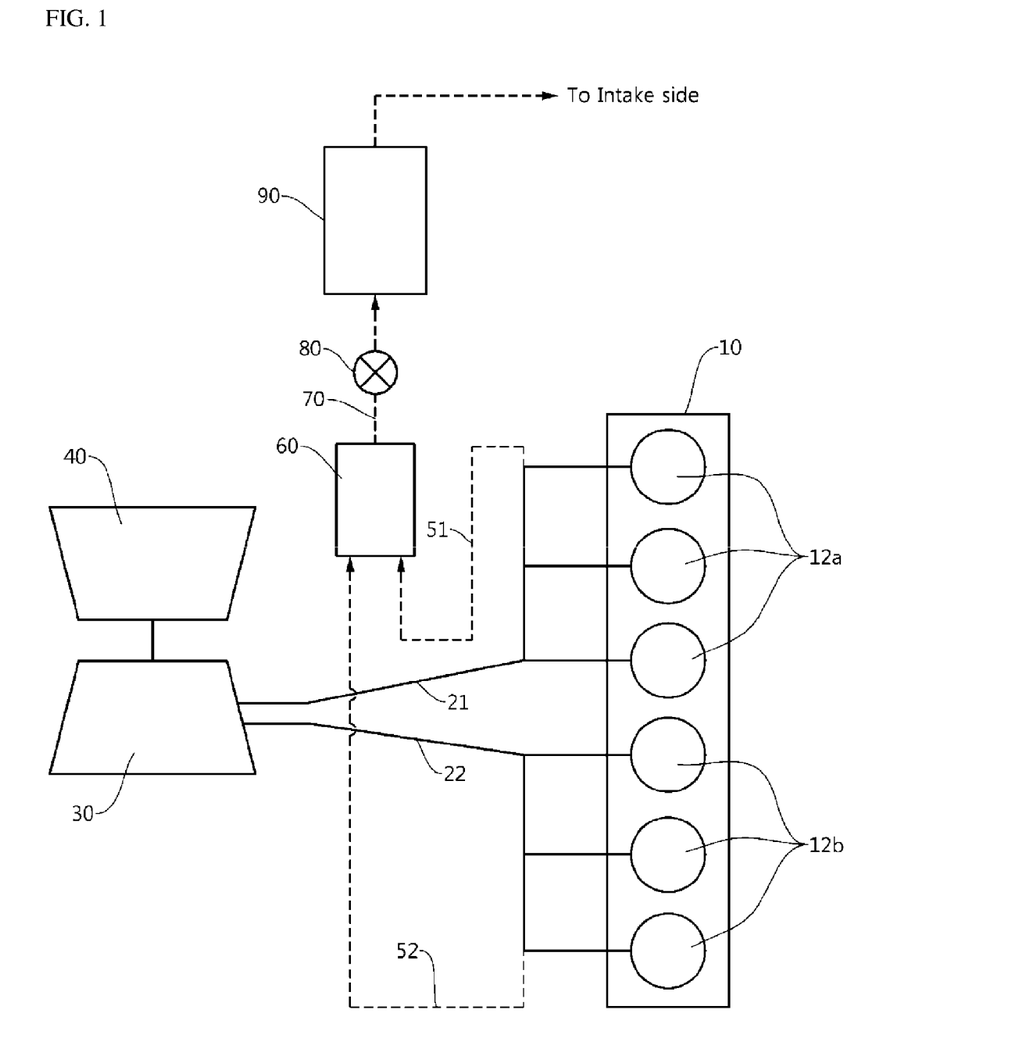
FIG. 1 is a view for explaining a system for recirculating engine exhaust gas in the related art.

However, the exhaust gas recirculation system in the related art illustrated in FIG. 1 has a complicated structure, and as a result, there is a problem in that manufacturing costs are increased.

In addition, in order to improve efficiency of the engine, it is necessary to additionally increase an amount of intake air, and it is necessary to further improve fuel efficiency.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Therefore, a technical problem to be achieved in some embodiments of the present disclosure is to provide a system for recirculating engine exhaust gas which may have a simplified structure.

In addition, another object of some embodiments of the present disclosure is to provide a system for recirculating engine exhaust gas, which improves output of an engine by increasing an amount of intake air, and further improves fuel efficiency.

A technical problem to be achieved in some embodiments of the present disclosure is not limited to the aforementioned technical problem, and any other not-mentioned technical problem will be obviously understood from the description below by those skilled in the technical field to which the present disclosure pertains.

In order to achieve the objects, a system for recirculating engine exhaust gas according to an exemplary embodiment of the present disclosure includes: first and second cylinder groups (12a, 12b) which include cylinders selected from cylinders of an engine; a first manifold (21) which is connected to the first cylinder group (12a), and combines and discharges exhaust gas discharged from the cylinders of the first cylinder group (12a); a second manifold (22) which is connected to the second cylinder group (12b), and combines and discharges exhaust gas discharged from the cylinders of the second cylinder group (12b); a branching unit (100) which is connected to the first manifold (21) and the second manifold (22), and at which exhaust gas discharged from both sides is combined; first and second exhaust lines (23, 24) which have one side that branches off from the branching unit (100), and the other side that is connected to a turbine (30) of a turbocharger as a pair, and provide a part of the exhaust gas to the turbine (30); and a combining recirculation line (70) which branches off from the branching unit (100).

In addition, the system for recirculating engine exhaust gas according to the exemplary embodiment of the present disclosure may further include a valve (80) which is installed on the combining recirculation line (70), and inhibits a back pressure exchange phenomenon.

In addition, the system for recirculating engine exhaust gas according to the exemplary embodiment of the present disclosure may further include a cooler (90) which is connected to the combining recirculation line (70), cools the exhaust gas flowing from the combining recirculation line (70), and supplies the cooled exhaust gas to a mixer of the engine.

The branching unit (100) of the system for recirculating engine exhaust gas according to the exemplary embodiment of the present disclosure may communicate with the first manifold (21), the second manifold (22), and the combining recirculation line (70) at one point.

Specific items of other exemplary embodiments are included in the detailed description and the drawings.

Advantageous Effects

The system for recirculating engine exhaust gas according to an exemplary embodiment of the present disclosure, which is configured as described above, may remarkably reduce manufacturing costs by simplifying a structure of the system for recirculating exhaust gas.

In addition, the system for recirculating engine exhaust gas according to an exemplary embodiment of the present disclosure may increase an amount of intake air, thereby improving output of the engine, and further improving fuel efficiency.

DESCRIPTION OF MAIN REFERENCE NUMERALS OF DRAWINGS

10: Engine
12a, 12b: First and second cylinder groups
21, 22: First and second exhaust manifolds
23, 24: First and second exhaust gas lines
30: Turbine
40: Compressor
51, 52: First and second recirculation lines
60: Pulse converter unit
70: Combining recirculation line
80: Valve
90: Cooler
100: Branching unit

DETAILED DESCRIPTION

Advantages and features of the present disclosure and methods of achieving the advantages and features will be clear with reference to an exemplary embodiment described in detail below together with the accompanying drawings.

Like reference numerals indicate like elements throughout the specification, constituent elements identical to constitute elements in the related art will be indicated by the same reference numerals, and duplicated descriptions thereof will be omitted.

Meanwhile, the terms used in the description are defined considering the functions of the present disclosure and may vary depending on the intention or usual practice of a manufacturer. Therefore, the definitions should be made based on the entire contents of the present specification.

Hereinafter, a system for recirculating engine exhaust gas according to an exemplary embodiment of the present disclosure will be described with reference to FIG. 2.

Figure 2:
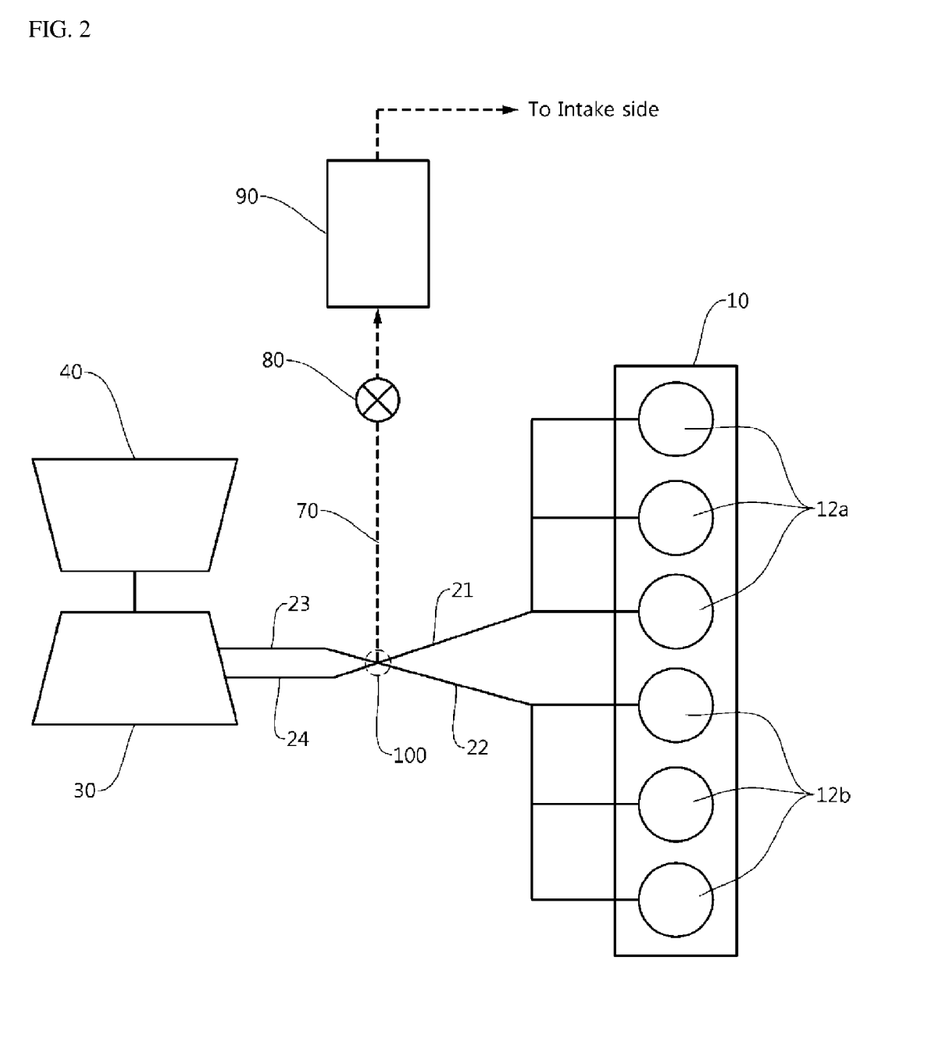
FIG. 2 is a view for explaining a system for recirculating engine exhaust gas according to an exemplary embodiment of the present disclosure.

The attached FIG. 2 is a view for explaining the system for recirculating engine exhaust gas according to the exemplary embodiment of the present disclosure.

The system for recirculating engine exhaust gas according to the exemplary embodiment of the present disclosure sends a part of the exhaust gas discharged from cylinders of an engine to a turbocharger, and cools the remaining part, and recirculates the remaining part.

A plurality of cylinders is provided in the engine, and several cylinders selected from the plurality of cylinders are defined as first and second cylinder groups 12a and 12b, respectively.

First and second manifolds 21 and 22 are provided in the first and second cylinder groups 12a and 12b, respectively.

The first manifold 21 is connected to the first cylinder group 12a, and combines and discharges exhaust gas discharged from the cylinders of the first cylinder group 12a.

In addition, the second manifold 22 is connected to the second cylinder group 12b, and combines and discharges exhaust gas discharged from the cylinders of the second cylinder group 12b.

A branching unit 100 is disposed between the first manifold 21 and the second manifold 22.

The exhaust gas discharged from the first and second manifolds 21 and 22 is combined by the branching unit 100.

In addition, first and second exhaust lines 23 and 24, which form a pair, are connected to the branching unit 100. The other side of each of the first and second exhaust lines 23 and 24, which form a pair, is connected to a turbine 30 of a turbocharger.

That is, the first and second exhaust lines 23 and 24 provide a part of the exhaust gas, which has been combined by the branching unit 100, to the turbine 30.

In addition, a combining recirculation line 70 is connected to the branching unit 100, such that a part of the combined exhaust gas branches off and is discharged.

When describing the branching unit 100 in more detail, the branching unit 100 may communicate with the first manifold 21, the second manifold 22, and the combining recirculation line 70 at one point.

In a case in which pressure in the first manifold 21 is high, and pressure in the second manifold 22 is low, the high pressure in the first manifold 21 may act as back pressure to the second manifold 22, but with the aforementioned configuration, the combining recirculation line 70 communicates with the first and second manifolds 21 and 22, thereby reducing back pressure.

In addition, in the system for recirculating engine exhaust gas according to the exemplary embodiment of the present disclosure, a valve 80 may be further installed on the combining recirculation line 70. The valve 80 inhibits a back pressure exchange phenomenon.

In addition, in the system for recirculating engine exhaust gas according to the exemplary embodiment of the present disclosure, a cooler 90 may be further installed on the combining recirculation line 70. The cooler 90 cools the exhaust gas flowing from the combining recirculation line 70, and supplies the cooled exhaust gas to a mixer of the engine.

The system for recirculating engine exhaust gas (EGR system) according to the exemplary embodiment of the present disclosure, which is configured as described above, has a structure which is more simplified than a structure of an exhaust gas recirculation system in the related art, such that the system for recirculating engine exhaust gas may be easily manufactured, and manufacturing costs may be reduced.

Meanwhile, since the first manifold 21 joins the second manifold 22 at the branching unit 100, there may be a risk that a back pressure interference phenomenon occurs, but the back pressure interference may be solved by adjusting the valve 80.

In addition, a portion where back pressure is exchanged may be a communication point of the branching unit 100, but because the exhaust gas to be recirculated is obtained at the communication point, the back pressure interference effect is reduced, and as a result, the exhaust gas recirculation system is stabilized.

In addition, in the system for recirculating exhaust gas according to the exemplary embodiment of the present disclosure, an amount of intake air is increased, and fuel efficiency is improved, and these effects will be described with reference to the attached FIGS. 3 to 5.

Figure 3:
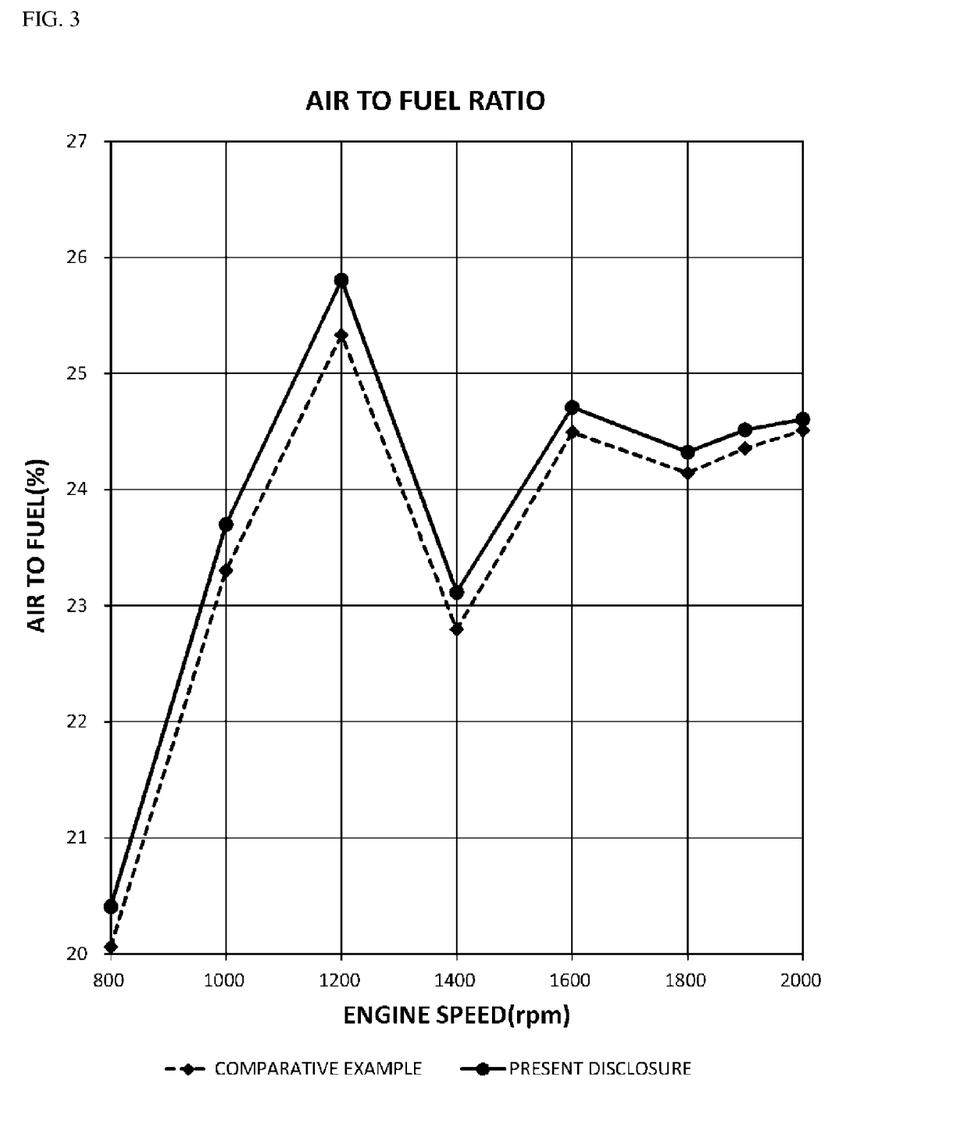
FIGS. 3 to 5 are comparative graphs for explaining an effect of the system for recirculating engine exhaust gas according to the exemplary embodiment of the present disclosure, which illustrate authorized fuel efficiency, pressure waveform, and a fuel consumption rate, respectively.
Figure 4:
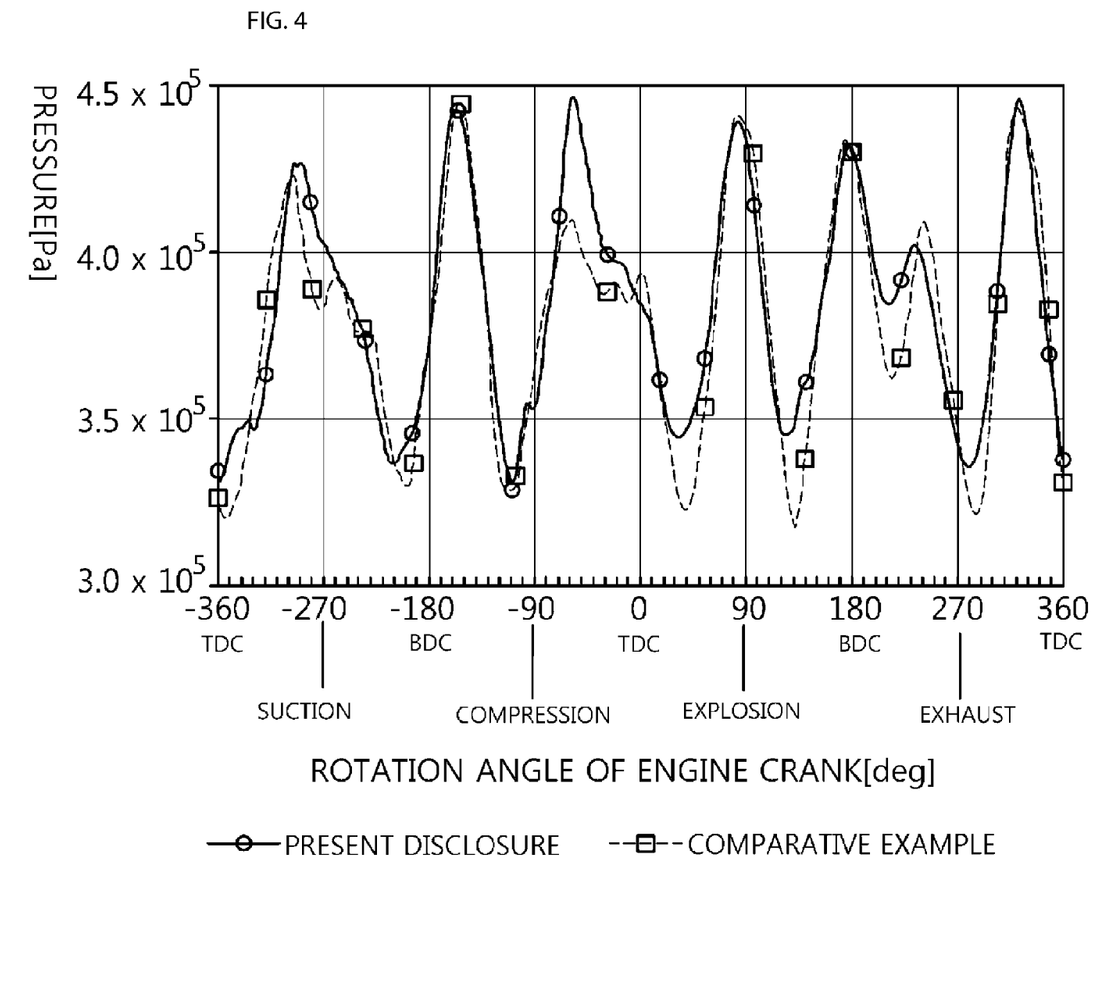
Figure 5:
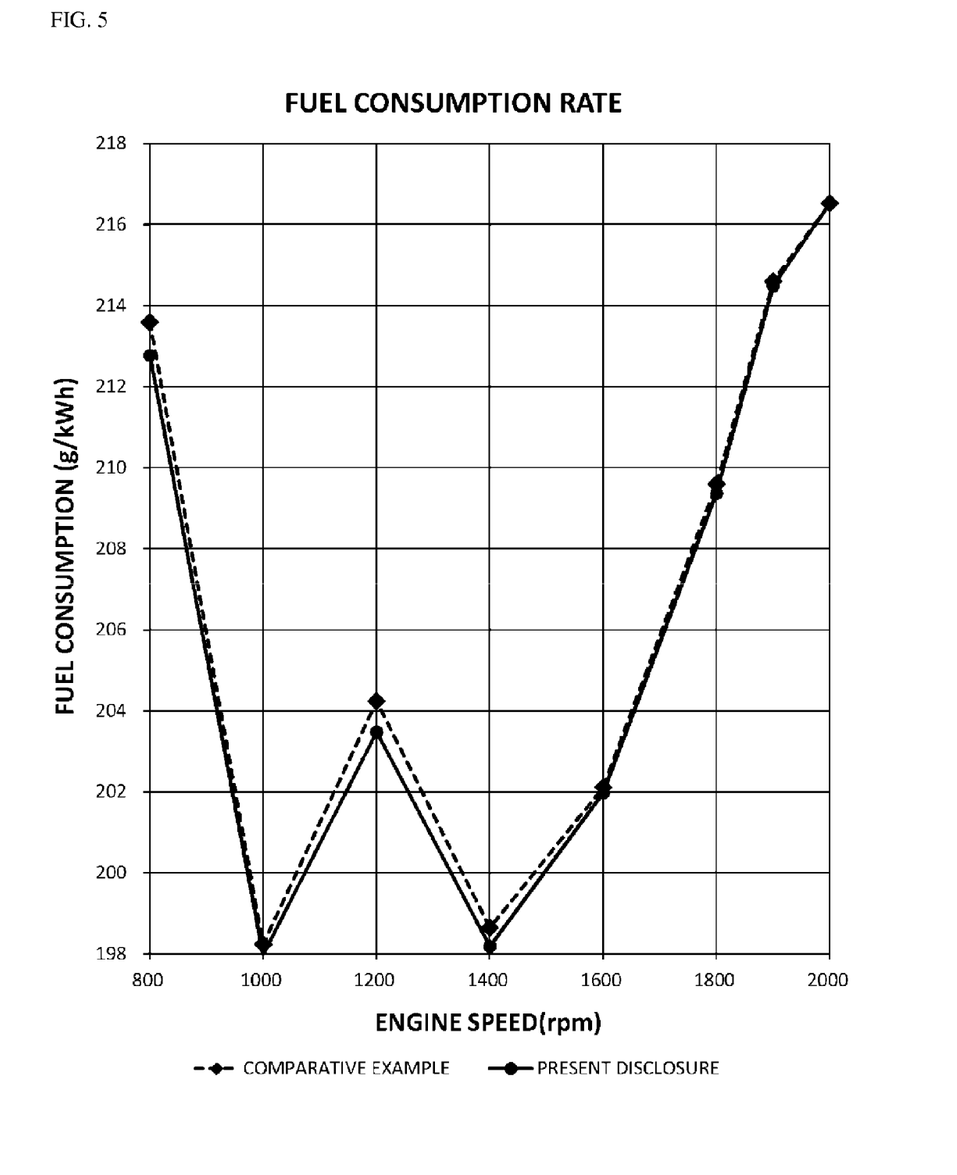

The attached FIGS. 3 to 5 are comparative graphs for explaining an effect of the system for recirculating engine exhaust gas according to the exemplary embodiment of the present disclosure, which illustrate authorized fuel efficiency, pressure waveform, and a fuel consumption rate, respectively.

FIG. 3 illustrates a result of an air to fuel ratio (AFR) that is a criterion for performance in sucking fresh air, and more particularly, illustrates a result of comparing a Comparative Example in the related art and the present disclosure.

Here, it can be understood that the higher the air to fuel ratio, the better the performance in sucking fresh air. The better performance in sucking fresh air advantageously acts upon the performance of an engine.

In addition, the same ratio of an amount of exhaust gas to be recirculated to an overall amount of exhaust gas, that is, the same exhaust gas recirculation ratio is set to the Comparative Example and the present disclosure, and then the tests are performed.

As can be seen from FIG. 3, it can be seen that the system for recirculating exhaust gas according to the exemplary embodiment of the present disclosure is better than the Comparative Example in terms of performance in sucking air, and this means that improved engine performance may be achieved in comparison with the related art.

In addition, it can be seen that the system for recirculating exhaust gas according to the exemplary embodiment of the present disclosure has relatively excellent performance at a high engine speed rather than at a low engine speed.

In addition, it can be seen that performance in sucking fresh air similar to that of the Comparative Example is achieved even in the vicinity of a maximum torque point.

That is, the present disclosure has a structure that is more simplified than a structure in the related art, but can achieve the same or better performance in sucking fresh air, and an improvement in engine performance can be expected.

FIG. 4 illustrates a result of measuring a pressure waveform at an exhaust port.

When the engine is driven, pressure is varied based on a displacement angle at which a crankshaft is rotated, and the number of cylinders, and the variation in pressure may be indicated as a pressure waveform as illustrated in FIG. 4.

Peaks and valleys are formed in the pressure waveform as many as the number of cylinders, and performance is better when a smooth waveform is formed at the peak portion.

Referring to FIG. 4, when comparing the present disclosure with the Comparative Example, it can be seen that the Comparative Example has a sharp waveform having deep valleys in some sections, but the present disclosure has a smoother waveform, which has valleys that are not relatively deep, than the Comparative Example.

In addition, the present disclosure has an exhaust pressure value that is generally greater than that of the Comparative Example, which means that the present disclosure may suck a larger amount of fresh air under the same fresh air suction condition, and it can be understood that performance in sucking fresh air is improved.

That is, the present disclosure has a structure that is more simplified than a structure in the related art, but can achieve the same or better performance in sucking fresh air, and an improvement in engine performance may be expected.

FIG. 5 is a graph illustrating a fuel consumption rate.

As illustrated in FIG. 5, the present disclosure has a relatively low fuel consumption ratio in comparison with the Comparative Example, and as a result, it can be seen that the fuel efficiency of the present disclosure is better than that of the Comparative Example.

That is, the present disclosure has a structure that is more simplified than a structure in the related art, but can achieve the same or better fuel efficiency.

As described above, the system for recirculating engine exhaust gas according to the exemplary embodiment of the present disclosure may remarkably reduce manufacturing costs by simplifying a structure of the system for recirculating exhaust gas.

In addition, the system for recirculating engine exhaust gas according to the exemplary embodiment of the present disclosure has a simplified structure, but may increase an amount of intake air, thereby improving output of the engine, and further improving fuel efficiency.

The exemplary embodiments of the present disclosure have been described with reference to the accompanying drawings, but those skilled in the art will understand that the present disclosure may be implemented in any other specific form without changing the technical spirit or an essential feature thereof.

Accordingly, it should be understood that the aforementioned exemplary embodiment is described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

The system for recirculating engine exhaust gas according to the exemplary embodiment of the present disclosure may be used to inhibit nitrogen oxide from being generated.

The invention claimed is:

1. A system for recirculating engine exhaust gas, comprising:
   first and second cylinder groups which include cylinders selected from cylinders of an engine;
   a first manifold which is connected to the first cylinder group, and is configured to combine and discharge exhaust gas discharged from the cylinders of the first cylinder group;
   a second manifold which is connected to the second cylinder group, and is configured to combine and discharge exhaust gas discharged from the cylinders of the second cylinder group;
   a branching unit which is connected to the first manifold and the second manifold, and at which exhaust gas discharged from both the first manifold and the second manifold is combined;
   first and second exhaust lines each of which has one side that is connected to the branching unit, and has an other side that is connected to a turbine of a turbocharger, and which are configured to provide the turbine with the exhaust gas that branches off from the branching unit after being combined at the branching unit; and
   a combining recirculation line which branches off from the branching unit, and is configured to guide a part of the exhaust gas combined at the branching unit to be combined with air to be intaken to the engine,
   wherein all of the flow of the exhaust gas discharged from each of the first and second manifolds are combined at the branching unit, and then branch off to the first and second exhaust lines and the combining recirculation line.

2. The system of claim 1, further comprising:
   a valve which is installed on the combining recirculation line, and is configured to inhibit a back pressure exchange phenomenon.

3. The system of claim 2, further comprising:
   a cooler which is connected to the combining recirculation line and is configured to:
   cool the exhaust gas flowing from the combining recirculation line; and
   supply the cooled exhaust gas to a mixer of the engine.

4. The system of claim 1, wherein the branching unit is configured such that the first manifold, the second manifold, the first exhaust line, the second exhaust line, and the combining recirculation line communicate with each other at one point of the branching unit.

* * * * *